United States Patent [19]

Inoue

[11] Patent Number: 5,289,195
[45] Date of Patent: Feb. 22, 1994

[54] POSITIONING AND DISPLAYING SYSTEM

[75] Inventor: Tetsuya Inoue, Yamato-Koriyama, Japan

[73] Assignee: Sharp Kabushiki Kaisha, Osaka, Japan

[21] Appl. No.: 9,173

[22] Filed: Jan. 26, 1993

[30] Foreign Application Priority Data

Jan. 27, 1992 [JP] Japan .................. 4-011986

[51] Int. Cl.⁵ .............................. G01S 3/02
[52] U.S. Cl. .................. 342/457; 342/357; 364/449; 340/990; 340/995
[58] Field of Search ............... 342/357, 457; 364/449; 340/990, 995

[56] References Cited

U.S. PATENT DOCUMENTS 5,103,400 4/1992 Yamada et al. .............. 340/990
5,191,532 3/1993 Moroto et al. .............. 340/990

FOREIGN PATENT DOCUMENTS 63-111485 5/1988 Japan .
3-89109 4/1991 Japan .

Primary Examiner—Theodore M. Blum
Attorney, Agent, or Firm—David G. Conlin; George W. Neuner

[57] ABSTRACT

A positioning and displaying apparatus includes a unit for positioning a current place, a unit for retrieving an area name containing the current place located by the positioning unit, and a unit for displaying characters indicating the area name retrieved by the retrieving unit.

9 Claims, 7 Drawing Sheets

MAP-RETRIEVING TABLE

| LEFT LOWER LATITUDE |
| LEFT LOWER LONGITUDE |
| POINTER TO MAP DATA |
| ⋮ |

POSITIONING AND DISPLAYING SYSTEM

BACKGROUND OF THE INVENTION

1. Field of the Invention

The present invention relates to a positioning and displaying system which is capable of positioning a current place of the system itself and displaying the current place.

2. Description of the Related Art

The inventors of the present application know a positioning and displaying system which is arranged to use a Global Positioning System (GPS) or a loran C.

The above-mentioned positioning system is, in general, arranged to indicate a latitude and a longitude of the current measured position with numerical values or the current measured position as a point on a map screen.

However, this type of positioning system has difficulty in directly recognizing the current place from the content on the display. Concretely, if a user is in a strange place, he or she often cannot recognize where the indicated position is.

SUMMARY OF THE INVENTION

It is therefore an object of the present invention to provide a positioning and displaying system which is capable of more clearly grasping where the current place is.

The object of the present invention can be achieved by a positioning and displaying apparatus includes a unit for positioning a current place, a unit for retrieving an area name containing the current place located by the positioning unit, and a unit for displaying characters indicating the area name retrieved by the retrieving unit.

Preferably, the positioning unit is adapted to display a map containing the current place on the displaying unit.

More preferably, the positioning unit is adapted to appear either a blinking point or a different color point on a latitude and a longitude of the current place.

The positioning unit is preferably adapted to retrieve an area name containing the latitude and the longitude of the current place.

The positioning unit is adapted to find out a map to be used and a location of map data to be stored, preferably.

The positioning unit is preferably adapted to retrieve a place name and to display characters of the place name.

The retrieving unit is adapted to select a proper square existing inside of the current place defined by a latitude and a longitude, preferably.

The retrieving unit is preferably adapted to determine whether the latitude and the longitude of the current place is on the selected area side of each line segment.

The retrieving unit is preferably adapted to determine whether the current place is on a selected area side of a (2n+1)th line segment or on a selected area side of a (2n+2)th line with the n representing a natural number.

The retrieving unit includes an external storage unit for storing data of a left lower latitude and a left lower longitude of a map data and a pointer for the map data so that all data needed to display the current place are read from the external storage unit in accordance with the pointer.

The external storage unit stores border data which contain the pointer to its place name, information indicating a location of the selected area, information indicating a side of a border in which the selected area is located, a longitude and latitude of a start point of the border, a difference of the latitude and the longitude between the start point and a next point.

The external storage unit further stores data for a place name retrieval table, and the retrieving unit is adapted to refer to the place name retrieval table by using the pointer contained in the border data about the selected area.

In operation, the GPS or the loran C is actuated to position the current place. Then, the positioning and displaying system serves to actually retrieve a name of an area containing the current place. The retrieved area name is displayed on the display unit with characters standing for the name itself.

Further objects and advantages of the present invention will be apparent from the following description of the preferred embodiment of the invention as illustrated in the accompanying drawings.

DESCRIPTION OF THE PREFERRED EMBODIMENTS

Referring to the accompanying drawings, an embodiment of a positioning and displaying system according to the present invention will be described in details.

Figure 1:
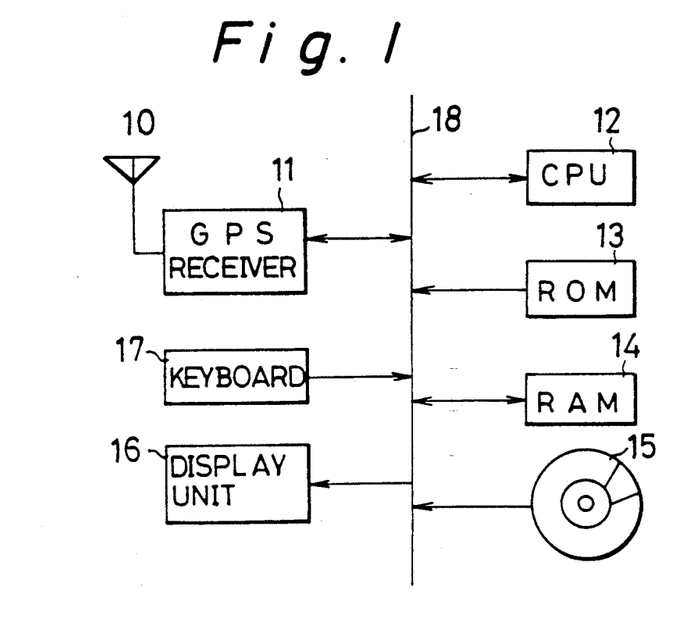
FIG. 1 is a block diagram schematically showing a GPS (Global Positioning System) navigation system according to an embodiment of the invention.

FIG. 1 shows a block diagram of a Global Positioning System (GPS) navigation system according to an embodiment of the present invention.

As shown in FIG. 1, an antenna 10 receives a signal of about 1.5 GHz transmitted from each satellite of the GPS. A RF signal from this antenna 10 is applied to a GPS receiver 11. The GPS receiver 11 is arranged that the RF signal is frequency-converted and then is converted into a digital signal in the GPS receiver 11 itself. The spectrum reverse diffusion and data demodulation about the digital signal are carried out before computing an object position.

The main part of the GPS navigation system includes a central processing unit (CPU) 12 which is a programmable data processing unit, a read-only memory (ROM) 13 for storing programs and various data, a random-access memory (RAM) 14 for temporarily storing various data, an external storage unit 15 such as a CD-ROM, an IC card for storing data such as map data and data for a place name retrieval table, a display unit 16 for displaying a map and a position, and a keyboard 17 for switching a displayed content. The connection between the GPS receiver 11 and those units is carried out through a data bus 18.

Figure 2:
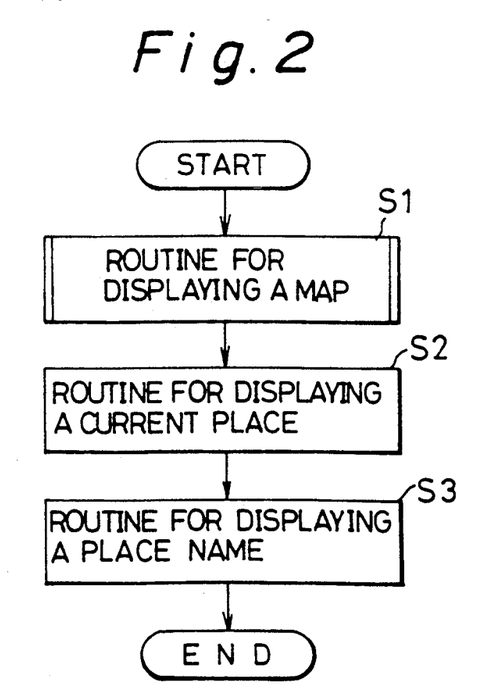
FIG. 2 is a flowchart showing a program for displaying a map and a place name based on the measured latitude and longitude.
Figure 3:
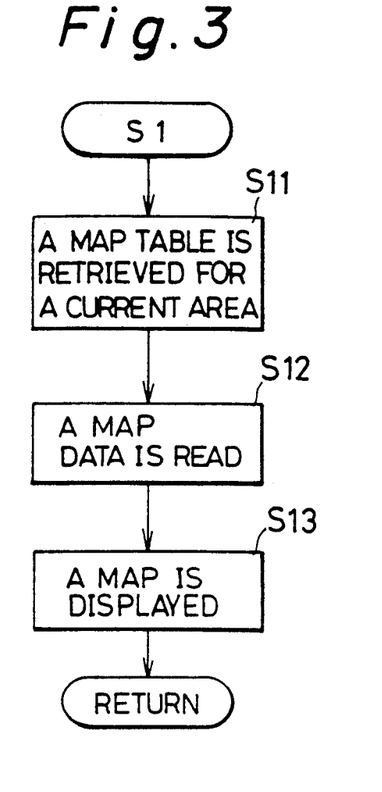
FIG. 3 is a flowchart showing a program for displaying a map based on the measured latitude and longitude.
Figure 4:
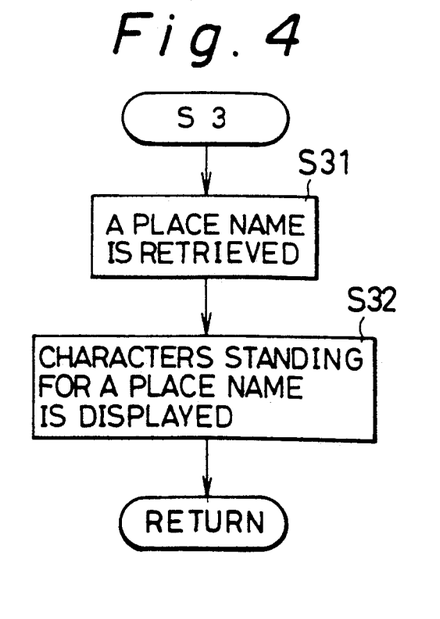
FIG. 4 is a flowchart showing a program for displaying a place name based on the measured latitude.

FIGS. 2 to 4 are flowcharts indicating a program for displaying the current position on a map based on the latitudes and the longitudes measured by the GPS receiver 11 or displaying a place name according to the present embodiment, and the CPU 12 operates in accordance with this program.

At first, as shown in FIG. 2, at a step S1, a subroutine is started for displaying a map containing the current place on the displaying unit 16.

The subroutine is shown in FIG. 3. In this subroutine, at a step S11, the operation is executed to retrieve a map table containing the latitudes and the longitudes of the measured current place.

Figure 5:
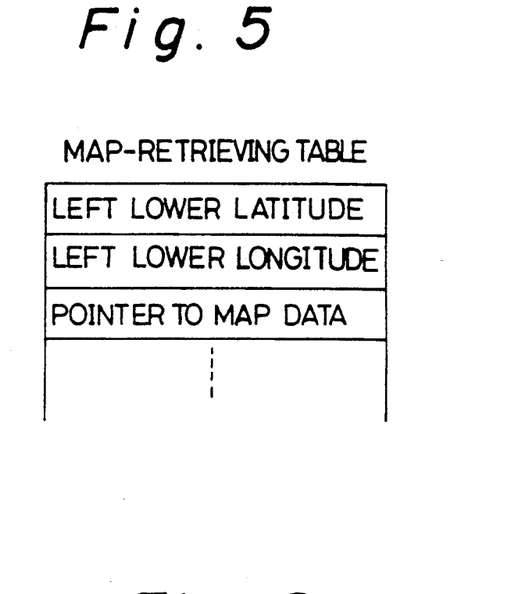
FIG. 5 is a view showing a map-retrieving table.

This map table is concretely shown in FIG. 5, that is, the external storage unit 15 (see FIG. 1) pre-stores a left lower latitude and a left lower longitude of the map data and a pointer for the map data. At the step S11 (see FIG. 3), the operation is executed to find out a map to be used and where the map data is stored.

At a step S12, the map data, that is, all the data needed to display the data about the current place is actually read from the external storage unit 15 according to the retrieved pointer. At the next step S13, the map is displayed on the display unit 16. Then, the operation exists out of this subroutine and returns to the routine shown in FIG. 2.

At the step S2 shown in FIG. 2, a blinking point or a different color point appears on the latitude and the longitude of the current place measured by the GPS. Then, at a step S3, a subroutine (see FIG. 4) is started to retrieve an area name containing the latitude and the longitude of the measured current place at the step S31. The retrieval will be concretely described later.

Figure 6:
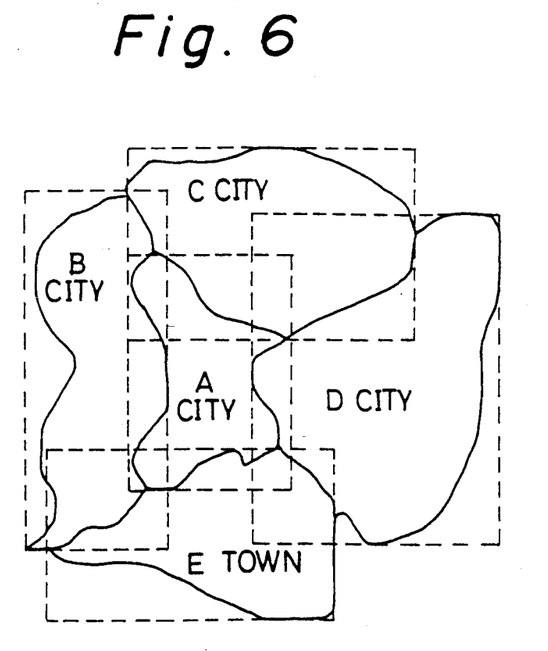
FIG. 6 is a view for explaining an operation of a program shown in FIG. 8.
Figure 7:
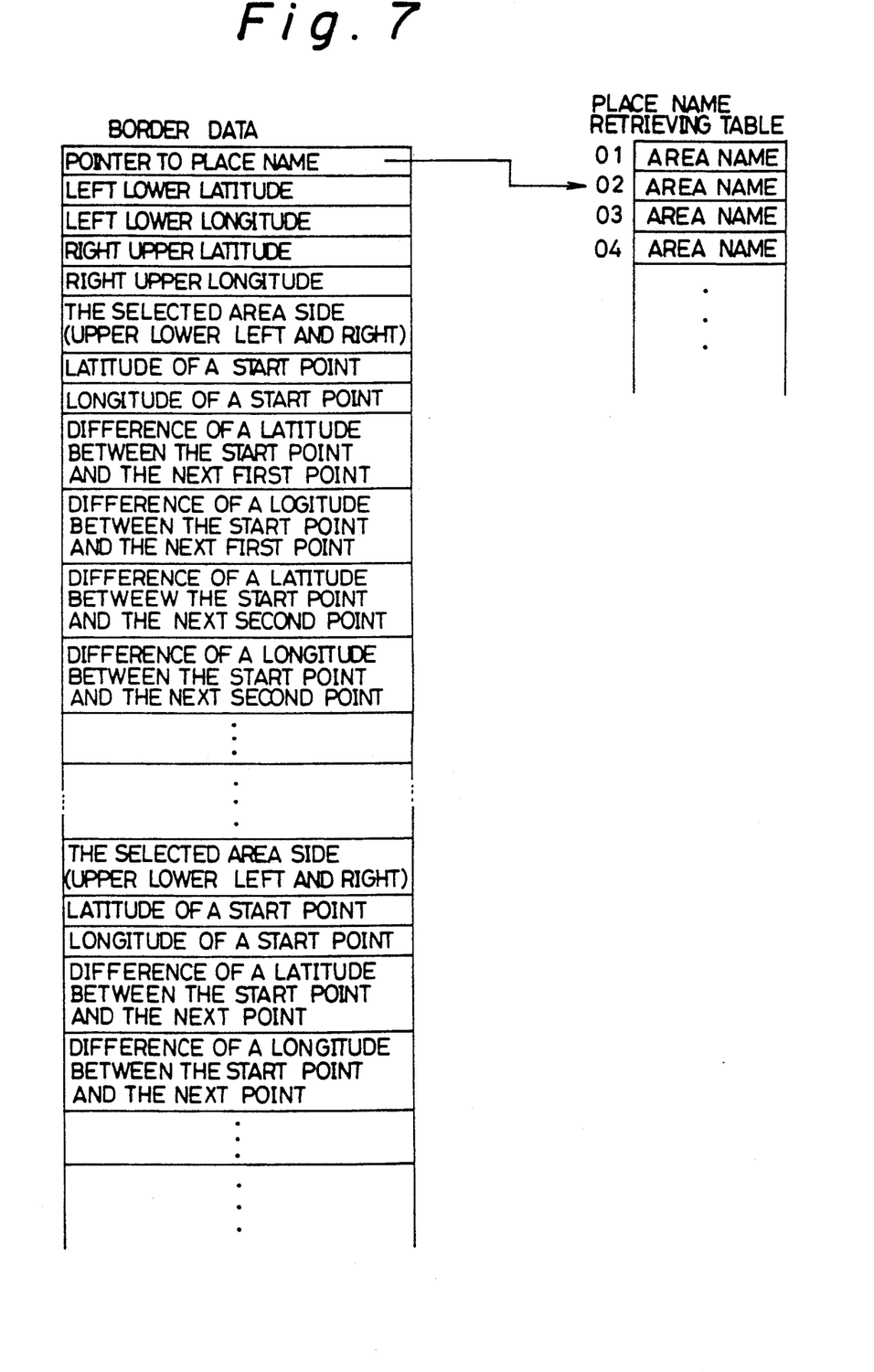
FIG. 7 is a view showing a border data table and a place name retrieving table.

As indicated by a broken line of FIG. 6, at first, there are set squares each containing an area whose name is to be displayed by characters such as an A city, a B city, a C city, a D city and an E town. About each square or its internal area set as above, border data shown in FIG. 7 is prepared and is stored in the external storage unit 15 of FIG. 1. As shown in FIG. 7, the border data contains a pointer to its place name, a left lower latitude and longitude, a right upper latitude and longitude, information about where the selected area is (upper, lower, right and left) indicating which side of a first border the selected area is, a longitude and latitude of the start point of the border, a difference of the latitude and the longitude between the start point and the next point, a difference of the latitude and longitude between the start point and the second point, a difference of the latitude and longitude between the start point and the third point, ... etc., information indicating which side of a second border the selected area is (upper, lower, right and left), a latitude and longitude of the start point of the second border, a difference of the latitude and longitude between the start point and the next point, a difference of the latitude and longitude between the start point and the second point, a difference of the latitude and longitude between the start point and the third point, a difference of the latitude and longitude between the start point and the fourth point, and so on.

Figure 8:
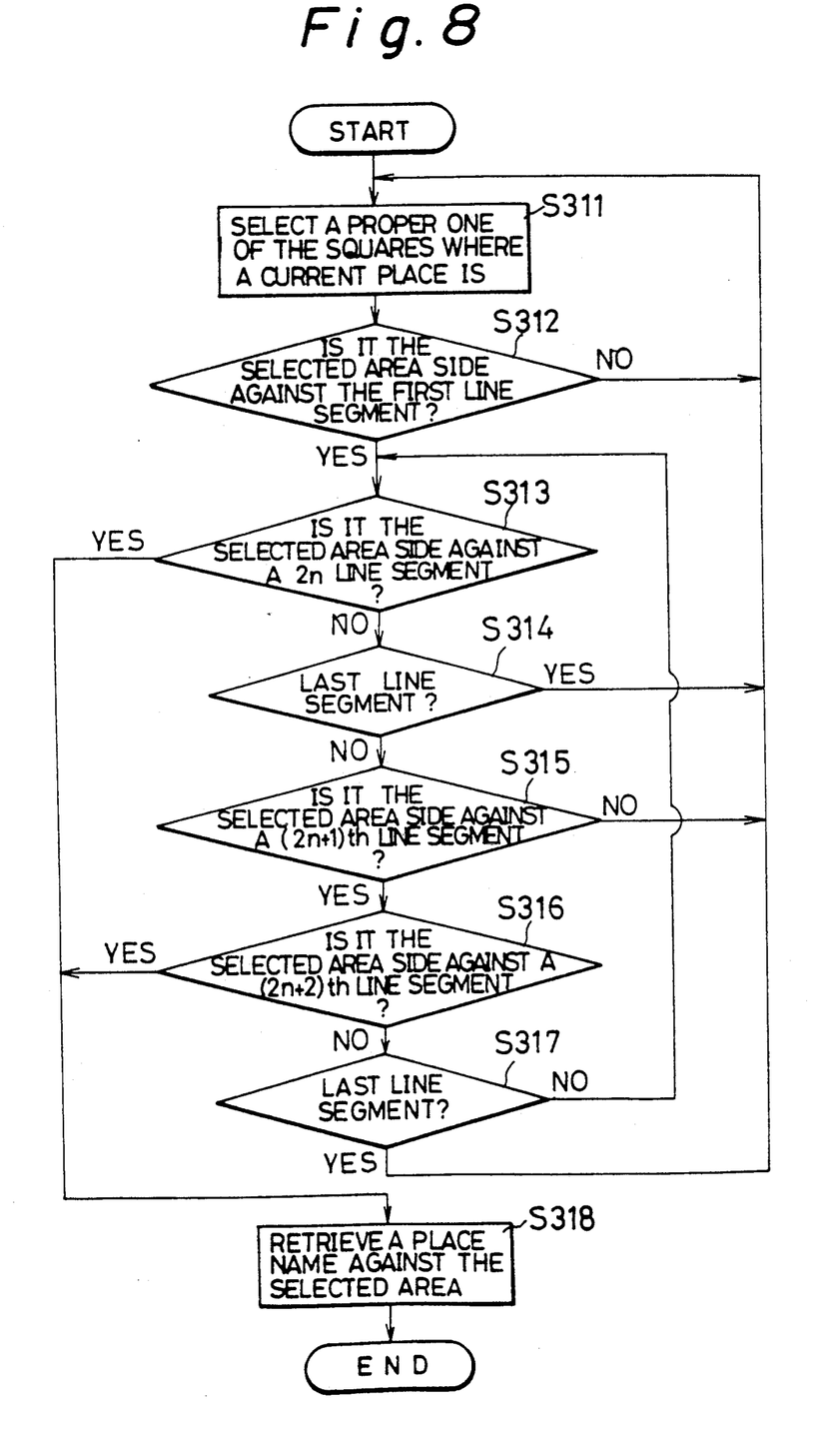
FIG. 8 is a flowchart showing a program for retrieving a place name according to an embodiment of the invention.

The actual retrieval is carried out by the processing routine shown in FIG. 8. At a step S311, the operation is executed to select a proper square among some squares existing inside of the current place defined by a latitude and a longitude. In the border data for the selected square, the data about all the line segments passing through the latitude of the current position is read from the table.

Then, at the steps S312 to S317, it is determined if the latitude and the longitude of the current place is on the selected area side of each line segment for the purpose of notifying a user of whether or not the latitude and longitude of the current position is inside of the selected area. The determination is carried out if the current position is on the upper or right side of each line segment or on the lower or left side of each line segment by the computation. Normally, it is vertically determined whether or not the current place is on the selected area side of the line segment. If the line segment is located in parallel to the longitude (that is, the line segment is vertical), it is horizontally determined.

Figure 9:
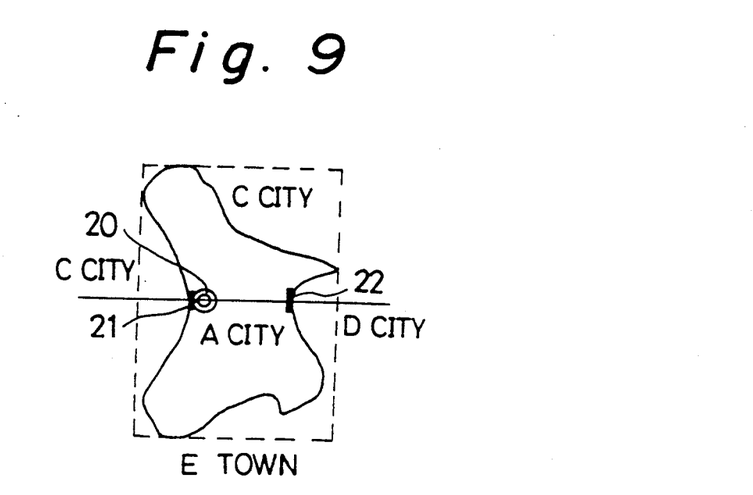
FIG. 9 is a view for explaining an operation of the program shown in FIG. 8.

For example, as shown in FIG. 9, it is assumed that a square about an A city is selected. The data about line segments 21 and 22 containing a latitude of the current place 20 is read out of the table. It is determined whether or not the current place 20 is on the right side of the line segment 21 or on the left side of the line segment 22 so as to determine whether or not the current place 20 is inside of the A city.

Concretely, at the step 312 (see FIG. 8), it is determined whether or not the current place 20 is on the selected area side against the first line segment 21. If it is not on the selected area side, the operation returns to the step S311 at which another square containing the latitude and the longitude of the current place is selected for performing the similar processing. If it is on the selected area side, the operation goes to a step S313 at which it is determined whether or not the current place 20 is on the selected area side against a 2n-th line segment (n is a natural number). If it is on the selected area side, it is determined that the current place 20 is inside of the selected area, that is, the A city. Then, the operation goes to a step S318. If the current place 20 is on the selected area side against the 2n-th line segment 22, the operation goes to a next step S314 at which it is determined whether or not this line segment is a last one. If so, the operation returns to the step S311 at which another square containing the latitude and the longitude of the current place is selected for performing the similar processing.

At the step S314, if it is determined that the line segment is not a last one, the processes from steps S315 to S317 are carried out. It is determined whether or not the current place is on the selected area side of a (2n+1)th (odd) line segment or on the selected area side of a (2n+2)th (even) line. The determination is repeated until the line reaches a last one for determining whether or not the current place is inside of the selected area at a final stage. If the current place is outside of the selected area, the similar processing is carried out about the next selected area (square). If the current place is inside of the selected area, the operation goes to a step S318.

Figure 10:
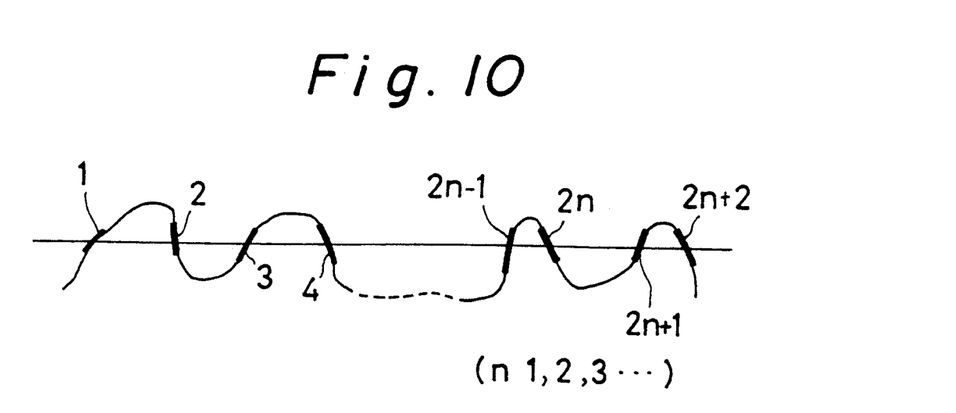
FIG. 10 is a view for explaining an operation of the program shown in FIG. 8.

As easily seen from FIG. 10, it is determined that the current place is inside of the selected area if the current place is on the selected area side at the even line segments. It is determined that the current place is outside of the selected area if the current place is on the side of the selected area at the odd line segments.

At the step S318, the place name retrieval table (see FIG. 7) is referred by using the "pointer to a place name" contained in the border data about a selected area, for example, an A city.

Figure 11:
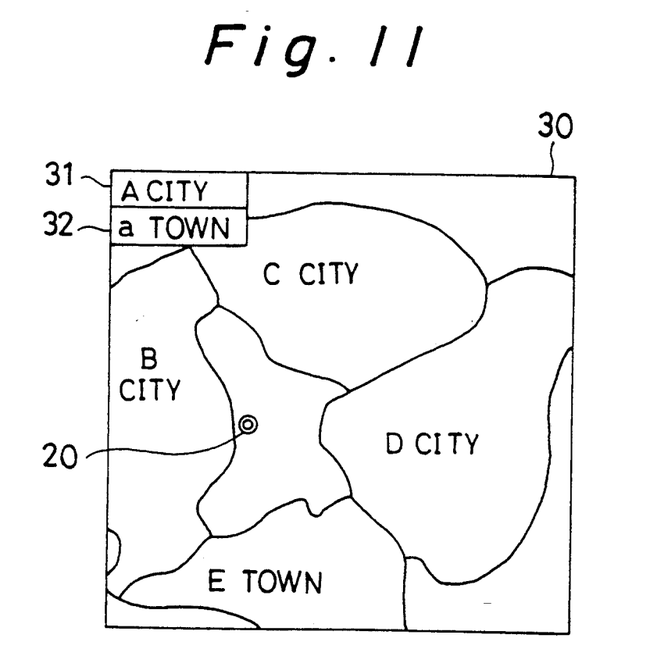
FIG. 11 is a view showing an example of display on the display.

Proceeding to a step S32 in the subroutine shown in FIG. 4, the characters standing for the name of the selected area are displayed on the display unit 16. As shown in FIG. 11, a map, a current place 20, and characters of "A city" standing for a name of an area containing the current place 20, and characters 32 of "A town" are displayed on the screen 30.

As set forth above, this embodiment is arranged to display, on the screen, the map, the current place, and the characters standing for a name of an area containing the current place. Hence, the user can easily grasp where the current place is, so that the user enables to quickly reach the destination.

The foregoing embodiment has been described about the navigation system. However, the present invention may apply to a positioning system having no navigating function. Further, the positioning method is not limited to the GPS but may employ any known method.

Many widely different embodiments of the present invention may be constructed without departing from the spirit and scope of the present invention. It should be understood that the present invention is not limited to the specific embodiments described in the specification, except as defined in the appended claims.

I claim:

1. A positioning and displaying apparatus comprising:
   means for positioning a current place on a map;
   means for retrieving an area name containing said current place located by said positioning means;
   means for displaying characters indicating said area name retrieved by said retrieving means; and
   an external storage means for storing a map table therein;
   said positioning means including an indicator which indicates a point on a latitude and a longitude of said current place, and being adapted to retrieve an area name containing said latitude and said longitude of said current place;
   said retrieving means being further adapted to select a proper square for defining an area therein, said proper square being situated inside of said current place defined by said indicator.

2. An apparatus according to claim 1, wherein said indicator is adapted to be either a blinking point or a different color point on said latitude and said longitude of said current place.

3. An apparatus according to claim 1, wherein said positioning means is further adapted to find out said map to be used from said map table and a location map data stored in said map table and further adapted to control said displaying means so as to display said map containing said current place on said displaying means.

4. An apparatus according to claim 3, wherein said positioning means is adapted to retrieve a place name and to display characters of said place name.

5. An apparatus according to claim 1, wherein said retrieving means is further adapted to determine whether or not said latitude and said longitude of said current place is located on a side of a line segment of said area defined by said proper square.

6. An apparatus according to claim 5, wherein said retrieving means is furthermore adapted to determine whether said current place is on a selected area side of a (2n+1)th line segment or on a selected area side of a (2n+2)th line with said n representing a natural number.

7. An apparatus according to claim 1, wherein said external storage means is adapted to store data of a left lower latitude and a left lower longitude of said map data and a pointer for said map data so that all data needed to display said current place are read from said external storage means in accordance with said pointer.

8. An apparatus according to claim 7, wherein said external storage means stores border data which contain said pointer to its place name, information indicating the location of said area, information indicating a side of a border in which said area is located, the longitude and latitude of a start point of said border, the difference of said latitude and longitude between said start point and a next point.

9. An apparatus according to claim 8, wherein said external storage means further stores data for a place name retrieval table, and said retrieving means is further adapted to refer to said place name retrieval table by using said pointer contained in said border data about said area.

* * * * *